March 3, 1959     C. E. COLE     2,875,784

THREE-WAY SOLENOID VALVE

Filed Jan. 5, 1954

INVENTOR.
CHARLES E. COLE
BY
ATTORNEY

United States Patent Office 2,875,784
Patented Mar. 3, 1959

2,875,784

THREE-WAY SOLENOID VALVE

Charles E. Cole, Tenafly, N. J., assignor to Bendix Aviation Corporation, Teterboro, N. J., a corporation of Delaware Application January 5, 1954, Serial No. 402,243

1 Claim. (Cl. 137—625.5)

This invention relates to solenoid controlled valves, and an object of the invention is the provision of an improved three-way solenoid controlled valve which is capable of directing a supply of pressure fluid to either one of two outlets.

A further object of the invention is the provision of a solenoid three-way controlled valve, which is of simple and practical construction in that it utilizes a minimum of parts and provides a maximum of efficiency.

A feature of the invention is provided in the balanced manner in which the valves of the device open and close, whereby the certainty and efficiency of valve operation is promoted.

Another feature of the invention is the particular construction of various chambers associated with valves of the device whereby valve blocks are prevented and valve opening efficiency is increased.

The invention further lies in the particular construction and arrangement of the various parts thereof and in their cooperative association with one another.

While the invention is capable of wide application, it finds particular use in association with high altitude aircraft, wherein it may be utilized to direct a flow of fluid pressure to either the de-icer system of the craft or to the G-suit of the pilot.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description, and is not to be construed as defining the limits of the invention.

In the drawing, wherein a solenoid controlled three-way valve embodying the invention is illustrated:

Figure 1:
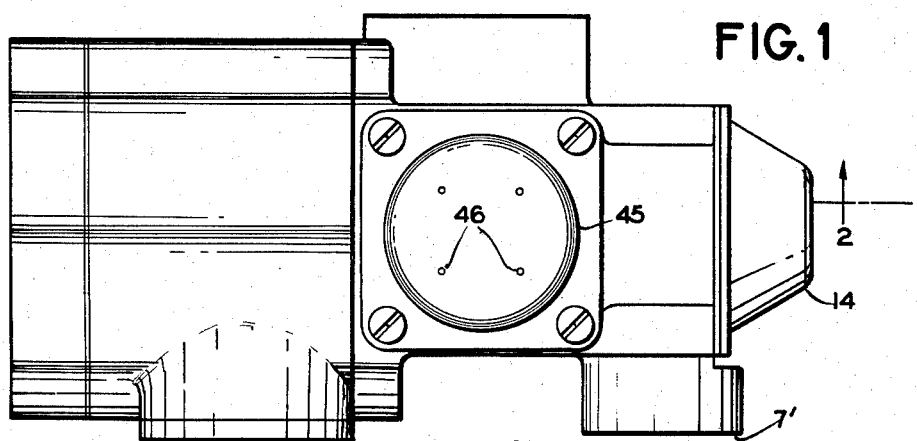
Fig. 1 is a top plan view thereof.
Figure 2:
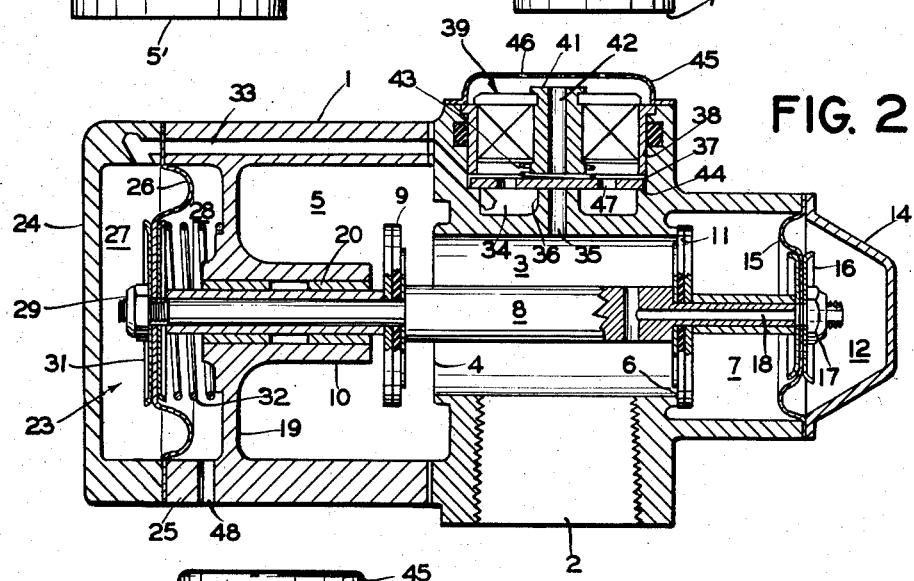
Fig. 2 is a longitudinal sectional taken on the line 2 of Fig. 1.
Figure 3:
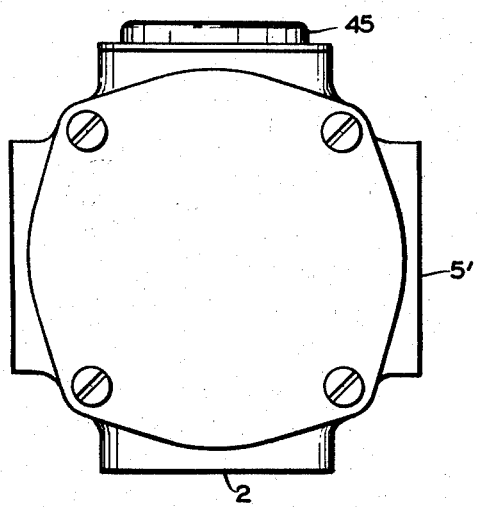
Fig. 3 is a left end view.

In describing the invention in further detail, reference is directed to the drawing, wherein there is disclosed a valve casing 1 having an inlet 2 adapted for connection to a supply of fluid under pressure. Inlet 2 communicates with a central chamber 3, which communicates on its left through a port 4 with a large outlet chamber 5, and communicates on its right through a port 6 with a smaller outlet chamber 7. The large outlet chamber 5 is adapted at 5' for connection with the de-icer system of an associated aircraft, while the smaller chamber 7 is adapted at 7' for connection with a pilot's G-suit.

To control flow through ports 4 and 6, an elongated valve stem 8 is provided. The latter extends through the connected chamber 3, 5 and 7. On this stem is mounted a pair of disc valve heads 9 and 11 in fixed spaced relation to one another. The latter are positioned on stem 8 in such manner that, when the stem is moved to the left, valve head 11 is seated on port 6 to close the same and valve head 9 is unseated from port 4 to open the same so as to allow a flow of supply pressure fluid from the chamber 3 to the outlet chamber 5. Conversely, when stem 8 is moved to the right, valve heat 9 is seated on port 4 to close the same and valve head 11 is unseated from port 6 to open the same so as to allow a flow of supply fluid from chamber 3 to the outlet chamber 7.

A pressure chamber 12 is formed to the right of chamber 7 by means of a crowned cover plate 14 secured to the casing 1 and by means of a diaphragm wall 15 gripped at its marginal circumferential edge between the cover plate and the casing. The diaphragm separates chamber 7 from chamber 12, and its central area is retained between a pair of disc plates forming a piston 16. The piston is held bolted together at 17 on the right end of the valve stem. Stem 8 is provided with a passageway 18 through the center of its right end portion which communicates chamber 3 with chamber 12. The area of the piston and diaphragm exposed to pressure created in chamber 12 by a flow of fluid pressure through passage 18 is equal to the area of the valve head 11 that is exposed to the fluid pressure in chamber 3. By this arrangement, the forces produced by the fluid pressure acting on valve head 11 are balanced, and as a result pressure fluid entering chamber 3 through the supply inlet does not open valve 11.

The large outlet chamber 5 is closed over on its left by a casing wall 19, the center of which is provided with an elongated hub 10 through which the left end portion of the valve stem passes and by which it is guided for sliding movement.

Suitable bushings 20 serve to aid the movement of the stem in the hub. To the left of casing wall 19 a chamber, generally designated 23, is formed by a crowned cover plate 24 secured over the rim 25 of an extended section of the housing. A diaphragm 26, the marginal peripherial edge of which is gripped between the cover plate 24 and the housing rim 25, divides the chamber 23 into a pair of compartments 27 and 28. The central area of the diaphragm is retained between a pair of plates bolted fast on the end 29 of the valve stem to form a piston 31.

A spring 32, compressed between the right plate of piston 31 and the wall 19, constantly tensions the valve stem leftward so that the valve head 11 is normally in a closed position, while valve head 9 is normally in an open position allowing pressure fluid flow to the outlet chamber 5 for use by the de-icer system of the associated aircraft.

Suitable means are provided for closing, when required, port 4 and opening port 6, so that the pressure fluid supply flow may be diverted from port 4 through port 6 to the outlet chamber 7 for use in a connected G-suit, not shown.

In order to actuate valve stem 8 to move to the right, so as to close port 4 and to open port 6, an arrangement is provided to cause a flow of pressure fluid from the supply inlet chamber 3 to the compartment 27 at the left of diaphragm 26. To this end, compartment 27 communicates by a passage 33 with an annular chamber 34. The latter in turn communicates with the supply chamber 3 by a passage 35. This passage extends through a flat surfaced boss 36 projecting up from the center of chamber 34. Chamber 34 is covered over by a disc 37, which disc separates chamber 34 from an enlarged opening 38 that continues to the outside of the housing. Sealed in the opening 38 is a solenoid 39 including a center core 41 having a through passage 42 communicating with a slight space above disc 37. A spring 43 between the solenoid and the disc 37 normally tensions the latter upon the surface of boss 36 to cover and close the passage 35. When so seated, disc 37 rests at its marginal edge upon an annular shoulder 44 of the housing. The opening 38 in which the solenoid is sealed is covered over by a crown plate 45 which has vents 46 in communication with the core passage 42. The latter communicates through holes 47 of disc 37 with the chamber 34, whereby the latter is vented to the atmosphere. Disc 37 acts as the armature of the solenoid and, when the latter is energized, the disc is drawn upwards to uncover the passage 35 and is carried against the core vent 42 to seal the latter. With the opening of passage 35, pressure fluid flows into chamber 34 and through passage 33 to enter compartment 27. The area of the piston and diaphragm 26 in compartment 27 is substantially greater than that of the valve head 9. The pressure effective on the piston and diaphragm 26 in chamber 27 forces the valve stem 8 to the right against the tension of spring 32. This action closes port 4 and opens port 6, whereupon supply pressure fluid is diverted from port 4 and flows through port 6 to the outlet chamber 7 for use in the G-suit of the pilot.

To permit the full supply pressure to be effective on the diaphragm 26, the compartment 28 to the right thereof is vented to the atmosphere by a passage 48. This prevents air blocking and allows a smooth, unimpeded movement of the valve stem.

The solenoid is adapted to be controlled by a suitable G-switch, not shown, sensitive to the acceleration of the associated aircraft, so that when required a flow of pressure fluid will be diverted to the pilot's G-suit.

Now, when the solenoid is de-energized, the armature disc 37 is released and tensioned back to close passage 35. As it does so, fluid in chamber 34 escapes through the disc holes 47 and is vented through the core passage 42 and crown vents 46 to the atmosphere. This arrangement allows a smooth and unimpeded movement of disc 37 in closing passage 35. It is plain that the pressure in chamber 27 will also be relaxed due to the vented passage 33, whereupon, the valve stem will again be tensioned leftward by spring 32 to close the port 6 and to open the port 4. As the stem moves leftward, fluid in compartment 27 is further vented to the atmosphere through passage 33 and the communicating vent passages. The pressure fluid in supply chamber 3 on being diverted from port 6 aids the spring 32 in opening port 4. Here again, the movement of the valve stem is smooth and unimpeded.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

In a valve of the character described, a valve body having a cylindrical inlet supply chamber in common axial communication through a first port with a first outlet chamber at one end and through a second port with a second outlet chamber at the other end, said first outlet chamber having a diameter about twice the diameter of said supply chamber, said valve body having a large inlet port to said supply chamber, an elongated valve stem axially disposed through all three chambers, a fourth chamber divided off from the first outlet chamber by a partition wall, the latter having an elongated axial extension extending toward said supply chamber and supporting the valve stem for axial movement therein, said axial extension providing the only rigid support for said valve stem, an end of the valve stem projecting through the partition wall into the fourth chamber, a flexible diaphragm fixed upon the latter stem end and dividing the fourth chamber into a first and a second compartment, a pair of valve heads arranged upon the stem in fixed spaced relation to one another, the valve stem having a normal position wherein one of the valve heads is seated over the second port and unseated from the first port, a spring in the second compartment compressed between the partition wall and the flexible diaphragm constantly urging the valve stem to its normal position, a second flexible diaphragm fixed upon the opposite valve stem end and dividing a fifth chamber off from the second chamber, said second diaphragm having a diameter slightly larger than the diameter of said supply chamber, narrow passage means extending axially through the said opposite end of the valve stem and communicating the supply chamber with the fifth chamber whereby pressure of supply fluid in the supply chamber acting upon the second valve head is substantially equalized by a corresponding force of pressure fluid communicated to the fifth chamber and exerted in the opposite direction against the second diaphragm, the valve body having a passage including a first flat surfaced boss adjacent said supply chamber communicating the first compartment with the supply chamber, a second flat surfaced boss opposite said first boss and venting said passage to atmosphere, valve means including a spring-biased perforated flat disc in sliding engagement with the wall of said passage between said bosses seated on said boss normally closing communication of the latter passage with the supply chamber, and solenoid operated means in said valve body spaced above said disc to control the opening and closing of the valve means by magnetically moving said disc, the perforated flat disc of said valve means when closed venting said first compartment to atmosphere and when open serving to allow a flow of pressure fluid from the supply chamber to the first compartment, and such pressure fluid serving to reverse the normal position of the stem and associated valve heads.

References Cited in the file of this patent

UNITED STATES PATENTS

| | | |
|---|---|---|
| 1,396,501 | Brooks | Nov. 8, 1921 |
| 2,516,996 | Jensen | Aug. 1, 1950 |
| 2,587,357 | McPherson | Feb. 26, 1952 |
| 2,641,281 | Phillips | June 9, 1953 |
| 2,711,757 | Gardner | June 28, 1955 |
| 2,720,891 | Glasgow | Oct. 18, 1955 |

FOREIGN PATENTS

| | | |
|---|---|---|
| 9,327 | Great Britain | of 1909 |
| 586,501 | Great Britain | of 1947 |